United States Patent Office 3,303,035
Patented Feb. 7, 1967

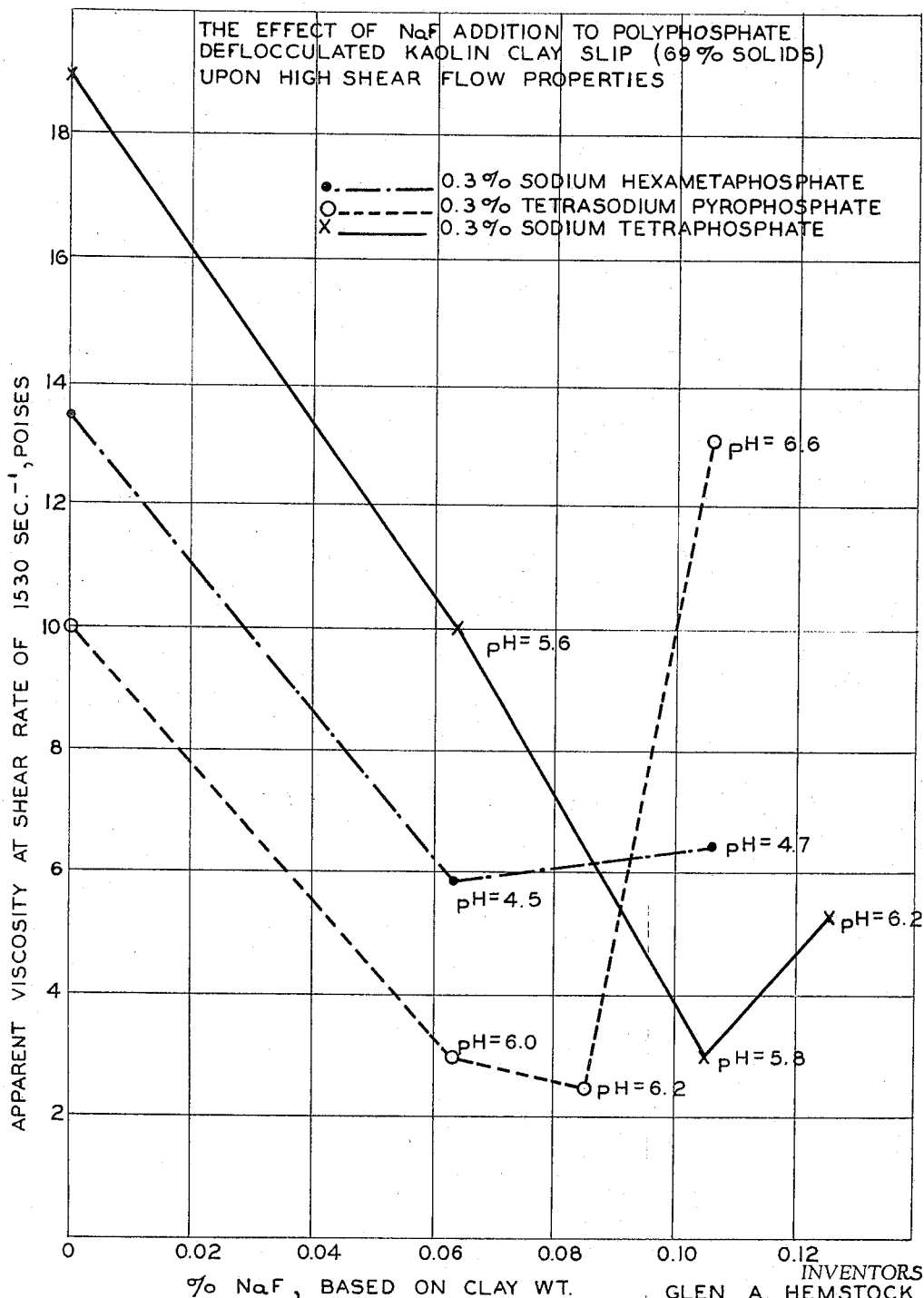

3,303,035
CLAY SLURRIES AND METHOD FOR MAKING SAME
Glen A. Hemstock, East Brunswick, and Robert J. Bergmann, Irvington, N.J., assignors to Minerals & Chemicals Philipp Corporation, Menlo Park, N.J., a corporation of Maryland
Filed Oct. 3, 1963, Ser. No. 313,583
18 Claims. (Cl. 106—72)

This invention is generally concerned with the rheological properties of clay slurries. The invention relates, more specifically, to a chemical treatment of dispersed slurries of kaolin clay to improve certain rheological properties thereof.

One of the most important uses of kaolin clay, especially a minus 2 micron size fraction of the clay, is as the sole or principal pigment ingredient in a coating color which is applied to paper to produce a desirable white surface finish thereon. At present the paper coating industry employs very high machine speeds and, in order to maintain adequate drying rates, highly concentrated coating colors are used. The formulation of coating colors of suitable solids concentration requires the use of aqueous clay slurries of very high concentration, frequently 68% to 72% clay solids. These slurries must have a sufficiently low viscosity at high shear rates to be pumped in the coating plant. Since kaolin clay slurries of this concentration are normally extremely viscous, clay dispersing agents (deflocculating agents) must be incorporated with the clay in order to make the slurries sufficiently fluid for pumping.

Salts of molecularly dehydrated phosphates, such as tetrasodium pyrophosphate and sodium hexametaphosphate (Calgon) are widely employed to disperse (deflocculate) high solids clay slurries or slips for use in paper coating production. These materials, as well as other clay dispersing agents, such as, for example, sodium citrate, are most effective in reducing the visocsity of high clay solids slurries at high rates of shears when the clay slurries are made alkaline by addition of sodium hydroxide. Thus, polyphosphate dispersing agents are especially effective with clay slurries having pH values within the range of 9 to 10 and sodium citrate is especially effective at a pH somewhat below 8. At pH values appreciably below 7, clay dispersing agents are not nearly as effective in reducing the viscosity of high solids clay slurries at high shear rates as they are at higher pH values. Therefore, these dispersing agents will not be as effective in low pH, high solids kaolin clay slurries adapted to be formulated with adhesives which require acidic dispersion media, such as, for example, cationic latex adhesives.

Accordingly, an object of this invention is the provision of methods and means for improving the high shear flow properties of concentrated kaolin clay slurries while maintaining the slurries acid.

Stated in another manner, an object is the provision of a method for reducing the apparent viscosity at high shear rates of concentrated deflocculated slurries of kaolin clay without increasing the pH of the slurries above 7.0.

Another object is the provision of a method for improving the effectiveness of polyphosphate clay dispersing agents at low pH values.

Still another object is the provision of clay slurries containing a combination of agents, which combination is appreciably more effective in reducing the apparent high shear viscosity of low pH clay slurries than either agent employed singly.

Other objects and features of the invention will be apparent from a description thereof which follows.

Briefly stated, in accordance with this invention, a small quantity of a particular fluoride salt, namely, sodium fluoride, is employed in combination with a clay dispersing agent to reduce the apparent high shear viscosity of a concentrated aqueous slurry of kaolin clay without increasing the pH of the slurry above 7.0.

An essential feature of the invention resides in the addition of the fluoride salt to a previously dispersed clay slurry since the desired results are usually not realized when the fluoride salt is incorporated into the slurry prior to the addition of clay dispersing agent to the slurry. Thus, in putting the invention into practice, a small amount of sodium fluoride is incorporated into a previously formed acidic clay dispersion containing a clay dispersing agent, especially a clay dispersing agent which is a sodium salt of a weak polyfunctional acid, such as a sodium polyphosphate clay dispersing agent. The quantity of fluoride salt that is incorporated into the clay dispersion is sufficient to reduce the viscosity of the dispersed (deflocculated) clay slurry at high rates of shear but is insufficient to increase the pH of the normally acidic dispersion to a value above 7.0.

The noteworthy effectiveness of sodium fluoride as an agent to reduce the apparent high shear viscosity of a previously dispersed concentrated slurry of kaolin clay was indeed surprising since sodium fluoride, when used singly, was found to be very ineffective as a dispersing agent for kaolin clay in a high clay solids slurry. In experimenting with a high viscosity paper coating grade of kaolin clay, it was found that the clay could not be formulated into a 69% solids aqueous slurry with sodium fluoride per se. It was unexpectedly found that when a 69% solids slurry of the same kaolin clay was prepared with sodium hexametaphosphate dispersing agent and a small amount of sodium fluoride was added to the polyphosphate dispersed slurry, the apparent viscosity of the slurry was reduced from a value in excess of 13.4 poises at a rate of shear of 1530 sec.$^{-1}$ for the slurry before addition of sodium fluoride to a value of only 5.8 poises at the same rate of shear. In effect, the sodium hexametaphosphate was more than twice as effective as a clay dispersing agent at high rates of shear when it was used with sodium fluoride additive in spite of the fact that sodium fluoride was of no apparent benefit when used alone. Even more spectacular results were realized when the sodium fluoride was incorporated into a clay slurry that had previously been dispersed with sodium tetraphosphate as the clay dispersing agent. In this case, the polyphosphate was more than four times as effective when it was used with sodium fluoride.

The beneficial effect of sodium fluoride as an additive to deflocculated high solids kaolin clay slurries was especially surprising since the desired results were not realized when other soluble fluorides were substituted for the sodium fluoride. Thus, ammonium bifluoride, potassium fluoride and potassium bifluoride were all ineffectual for the purpose disclosed and were substantially without effect on the high shear viscosity of polyphosphate dispersed concentrated kaolin clay slurries. Hydrofluoric acid increased substantially the high shear viscosity of a polyphosphate dispersed high solids clay slurry and was, therefore, inoperative.

The subject invention is especially applicable to the treatment of kaolin clay slurries containing from about 60% to about 70% clay solids (weight basis) although benefits may also be realized with clay slurries as dilute as about 50% solids or as concentrated as about 80% solids. With most kaolin clays, a 72% clay solids slip is about the maximum obtainable even when the most effective clay dispersing agents are used.

The clay that is used in carrying out the invention is a naturally occurring clay mineral consisting predominantly of the clay mineral kaolinite, a crystalline hydrated aluminum silicate of the formula $Al_2O_3 \cdot 2SiO_2 \cdot 2H_2O$. The invention is especially useful with commercial paper coating grades of kaolin clay which have been chemically bleached and which have been refined to at least the extent that grit and undispersible agglomerates have been eliminated. Normally, kaolin slurries have a pH within the range of about 3.0 to 5.0, usually about 4.5, in the absence of clay dispersing agents.

The clay dispersing agents (defluocculating agents) used in putting this invention into practice encompass sodium salts of weak acids, especially sodium salts of weak polyfunctional acids, and which are effective in dispersing clay slurries at pH values not to exceed 7.0. In other words, the invention encompasses the use of dispersing agents which, when incorporated into the water in which the kaolin clay is slurried, fluidize the clay slurry without increasing the pH of the slurry to a value which exceeds 7.0. As examples of clay dispersing agents may be mentioned: sodium polyphosphate clay dispersing agents, e.g., sodium hexametaphosphate, tetrasodium pyrophosphate and sodium tetraphosphate; sodium silicate, sodium citrate and ammonium compounds analogous with the aforementioned sodium salts. Organic clay dispersing agents can also be employed within the scope of this invention.

Excellent results have been realized with a wide variety of clay dispersing agents and the chemical composition of the clay dispersing agent does not appear to be critical. However, since clay dispersing agents will affect the pH of the clay slurry, the selection of a clay dispersing agent will depend on the pH desired in the ultimate clay slurry formulation. This invention is especially applicable to the provision of deflocculated clay dispersion having a pH within the range of about 4.0 to 6.0.

The usual quantity of clay dispersing agent can be employed in putting this invention into practice. However, some departure from use of normally optimum quantity of a clay dispersing agent may be of benefit. As is known in the art, polyphosphate clay dispersing agents are usually used in amount within the range of from about 0.10% to 0.50%, especially about 0.25% to 0.35%, of the clay weight, on a moisture free clay basis, and such proportions are suitable in carrying out this invention. (Moisture free clay weight is determined by heating the clay to essentially constant weight at 225° F.)

The quantity of fluoride salt employed in carrying out this invention is usually within the range of about 0.02% to about 0.20%, based on the weight of the clay, on a moisture free clay basis. For any species of clay dispersing agent, there appears to be a distinctly optimum quantity of fluoride salt addition. This quantity will be expected to vary somewhat with the nature of the clay, especially the particle size distribution of the clay. The optimum quantity of fluoride salt can be readily determined by simple experimentation, as described hereinafter. With familiar sodium polyphosphate dispersing agents, preferred quantities of sodium fluoride addition usually lie within the range of about 0.04% to about 0.12% of the moisture free clay weight.

The following examples are given to illustrate this invention more fully.

All viscosity values mentioned in the examples and in the appended claims refer to values obtained with a Hagan Viscometer using the medium bob and medium torque linkage. In the Hagan instrument, the torque-r.p.m. curve is recorded on a circular graph. In this graph, bob speed is represented as a percentage of maximum bob speed and is recorded by figures around the outside circumference of the graph. Torque, which is represented on the graph as a percentage of maximum torque, is recorded radially on the circular graph. Absolute values of rate of shear in sec.$^{-1}$ are calculated by multiplying the percent of maximum speed by 108. Absolute values of torque (shearing force) in dyne-cm. are calculated for the medium bob and medium torque linkage by multiplying the percentage of maximum torque recorded on the Hagan rheogram by $1.25 \times 10^4$. Apparent viscosity in poises is obtained by dividing the shearing force per unit area by the rate of shear. Since the apparent viscosity is inversely proportional to rate of shear at a given shearing force (torque), a fluid of highest apparent viscosity is indicated by a rate of shear-stress curve with maximum shearing force at a minimum rate of shear. In testing with the Hagan instrument, a sample of the clay slurry is placed in the cup of the instrument and the bob lowered into the sample. The machine is turned on and the hand crank which activates the transmission is turned at a speed of 1 r.p.s. until either 100% torque or a speed 80% of scale (the maximum speed obtainable with the Hagan instrument) is reached. The downcurve of the rheogram is then obtained by operating the hand crank in the same manner employed in obtaining the upcurve. A circular rheogram recording variation of torque with rate of shear (as indicated by bob speed) is automatically traced out.

*Example I*

(a) This example illustrates the application of this invention to the improvement of high shear viscosity of high solids normally acidic kaolin slurries that have been deflocculated with sodium polyphosphate clay dispersing agents.

The clay used in this example was a commercial chemically bleached paper coating grade of kaolin clay supplied to the trade as "Stellar" clay. This clay is a fine size fraction of raw Georgia kaolinite and has a particle size distribution such that 92% by weight is finer than 2.0 microns as determined by the sedimentation method described in TAPPI Standards, T649SM-54. The pH of a 1% slurry of this clay in distilled water is about 4.5.

The clay was dried at 105° C. and the following materials added to portions of the clay at ambient temperature in the order given: distilled water, 1 N solution of polyphosphate dispersing agent in amount of 0.3%, based on the moisture free clay weight. The clay solids in the resultant dispersed clay slurries were slightly in excess of 69.0%. Various quantities of fluoride salt were incorporated into portions of the polyphosphate dispersed clay slurries. The salt was added as a solution of 1 N concentration to the dispersed kaolin clay slurry with agitation at room temperature. The dispersed slurry was then brought to 69.0% clay solids level, as measured by a Cenco Moisture Balance, by addition of an appropriate amount of distilled water.

The accompanying figure shows curves which correlate apparent high shear viscosity (1530 sec.$^{-1}$) with percent sodium fluoride addition to three different polyphosphate dispersed clay slurries (all 69.0% clay solids slurries). The ordinates for these curves were obtained by converting values on a Hagan circular chart into rectilinear co-ordinates. Also given in the figure are pH values of slurries represented by data points on the curves.

These curves show that the high shear viscosity of various polyphosphate dispersed high solids clay slurries could be reduced significantly without increasing pH above 7.0 by addition of a small quantity of sodium fluoride and that for each polyphosphate dispersing agent there was an optimum quantity of sodium fluoride addition.

The results show also that maximum reduction in viscosity was realized with sodium tetraphosphate as the clay dispersing agent, in which case addition of 0.1% NaF effected more than a five-fold decrease in high shear viscosity of the polyphosphate deflocculated clay slurry.

(b) An attempt was made to produce a 69.0% solids aqueous slurry of the Stellar clay without polyphosphate dispersing agent by slurrying the clay in water containing various quantities of sodium fluoride. It was found that a 69.0% solids slurry could not be made up with sodium fluoride in the absence of polyphosphate clay dispersing agent.

*Example II*

This example shows the fluoride salt must be incorporated into a previously deflocculated kaolin clay slurry to realize the desired reduction in high shear viscosity.

A 69.0% clay solids slurry was prepared as in Example I by agitating a commercial paper coating grade of kaolinite in distilled water containing tetrasodium pyrophosphate dispersing agent in amount of 0.3% of the moisture free clay weight. A Hagan rheogram of the dispersion was obtained. Another sample of the same clay was slurried at 69.0% solids in water containing 0.1%, NaF, based on the moisture free clay weight. Tetrasodium pyrophosphate was then added to the latter clay slurry in amount of 0.3% of the moisture free clay weight. A Hagan rheogram of this slurry was found to be substantially identical with the Hagan rheogram of the first clay slurry which had been made without sodium fluoride addition. A comparison of this result with results of experiments in Example I in which sodium fluoride was incorporated into clay slurries previously deflocculated with tetrasodium pyrophosphate indicates that the fluoride salt must be incorporated into a previously deflocculated high solids kaolin slurry to achieve the desired reduction in high shear viscosity.

*Example III*

This example illustrates the application of this invention to a sodium citrate deflocculated kaolin slurry.

A slurry of a paper coating fraction of Georgia kaolin clay having an average equivalent spherical diameter of about 1.5 microns (ASP 200) was prepared by agitating the clay in an aqueous solution of sodium citrate in amount of 0.3% based on the clay weight, and adjusting the clay solids to 68.0% by addition of distilled water. A Hagan rheogram of the resultant clay dispersion was obtained and the pH measured. Another dispersion was prepared in the same manner with the same ingredients and to this clay dispersion a small amount of sodium fluoride was added as a 1 N solution and clay solids was adjusted to 68.0% by addition of distilled water. A Hagan rheogram of this dispersion was obtained to study the effect of sodium fluoride addition on a high solids dispersion of kaolin deflocculated with sodium citrate. The results are summarized in table form.

EFFECT OF SODIUM FLUORIDE ADDITION ON SODIUM CITRATE DEFLOCCULATED CLAY SLURRY

| Percent[1] Na Citrate | Percent[1] NaF | pH of Slurry | Apparent Viscosity of Slurry at 1530 sec.$^{-1}$ Poises |
|---|---|---|---|
| 0.300 | None | 4.9 | 16.9 |
| 0.300 | 0.084 | 6.3 | 10.5 |

[1] Based on moisture free clay weight.

Data in the table show that the apparent high shear viscosity of the sodium citrate deflocculated slurry was reduced almost 40% by addition of an extremely small amount of sodium fluoride. While the pH of the dispersion was increased by the addition of sodium fluoride, the sodium citrate deflocculated dispersion was still on the acid side.

The incorporation of sodium fluoride into a previously deflocculated concentrated clay slurry to reduce the high shear viscosity of the concentrated clay slurry, in accordance with the subject invention, is to be distinguished from the prior suggestion to use potassium fluoride (which is inoperative for purposes of this invention) as the sole deflocculating agent for a dilute kaolin slip of the type used in the ceramic field (see an article by Kingery in J. A. Ceram. Soc. 34, 242 (1951) as to the use of fluoride ion in deflocculating dilute clay slips).

We claim:

1. A composition adapted for use in coating paper and comprising finely divided kaolin clay, a clay dispersing agent and sodium fluoride in amount from 0.02% to 0.20% of the weight of said clay, said composition having a pH not to exceed 7.0.

2. An acidic clay slurry comprising an aqueous dispersion of kaolin clay, a clay dispersing agent which is a sodium salt of a weak acid, and sodium fluoride in amount from 0.02% to 0.20% of the weight of said clay.

3. A clay slurry comprising an aqueous dispersion of kaolin clay, a sodium polyphosphate clay dispersing agent and sodium fluoride in amount from 0.02% to 0.20% of the weight of said clay, said slurry having a pH not to exceed 7.0.

4. A fluid composition comprising kaolin clay, a sodium polyphosphate clay dispersing agent in amount within the range of 0.1% to 0.5% of the weight of said clay, and sodium fluoride in amount from 0.02% to 0.20% of the weight of said clay, said composition having a pH within the range of 4.5 to 6.2.

5. A clay slurry comprising an aqueous slurry of kaolin clay, sodium hexametaphosphate in amount sufficient to defloccualte said clay slurry and sodium fluoride in amount from 0.02% to 0.20% of the weight of said clay, said slurry having a pH of about 5.0 to 6.0.

6. A clay slurry characterized by having a low viscosity at high shear rates and comprising a concentrated aqueous dispersion of kaolin clay that is deflocculated with sodium hexametaphosphate and contains about 0.04% to 0.10%, based on the weight of said clay, of sodium fluoride, said slurry having a pH within the range of about 5.0 to 6.0.

7. A clay slurry of reduced viscosity at high shear rates and comprising water, kaolin clay in amount to form a slurry of about 60% to about 70% clay solids, sodium hexametaphosphate as a dispersing agent for said clay and sodium fluoride in amount sufficient to reduce the apparent viscosity of said slurry at a shear rate of 1530 sec.$^{-1}$ to a value that is substantially less than the apparent viscosity of said slurry at said shear rate in the absence of said sodium fluoride, said slurry having a pH of about 5.0 to 6.0.

8. A high solids clay slurry especially adapted for use in the production of clay coated paper, said slurry consisting essentially of water, kaolin clay in concentration from about 60% to 70% by weight, clay dispersing agent in amount sufficient to defloccualte said clay in said water, and sodium fluoride in amount within the range of from about 0.02% to 0.20% based on the clay weight, the quantity of said sodium fluoride being sufficient to reduce the apparent viscosity of said slurry at a shear rate of 1530 sec.$^{-1}$ to a value that is substantially less than the apparent viscosity of said slurry at said shear rate in the absence of said sodium fluoride.

9. A high solids clay slurry especially adapted for usein the production of clay coated paper, said slurry consisting essentially of water, kaolin clay in concentration from about 60% to 70% by weight, sodium hexametaphosphate in amount within the range of about 0.2% to 0.5% of the weight of said clay and sodium fluoride in amount within the range of from about 0.08% to 0.14% of the weight of said clay.

10. A clay slurry having a pH below 7.0 and comprising water, kaolin clay, sodium citrate in amount sufficient to defloccualte said kaolin clay in said water and a small amount of sodium fluoride, the amount of sodium fluoride being sufficient to decrease substantially the apparent viscosity of said slurry at a rate of shear of 1530 sec.$^{-1}$.

11. A method for reducing the high shear viscosity of an acidic concentrated aqueous slurry of kaolin clay containing a clay dispersing agent which comprises providing a concentrated aqueous slurry of kaolin clay containing a clay dispersing agent and having a pH below 7.0 and incorporating into said slurry a small amount of sodium fluoride, the quantity of sodium fluoride being sufficient to decrease substantially the apparent viscosity of said slurry at a rate of shear of 1530 sec.$^{-1}$ but being insufficient to increase the pH of said slurry to a value above 7.0.

12. The method of claim 11 in which said dispersing agent is a polyphosphate salt.

13. The method of claim 11 in which said dispersing agent is a sodium polyphosphate salt.

14. The method of claim 11 in which said dispersing agent is sodium citrate.

15. A method for reducing the high shear viscosity of an acidic concentrated aqueous slurry of kaolin clay containing a clay dispersing agent which comprises providing an aqueous slurry of kaolin clay in water containing sufficient clay dispersing agent to form a slurry containing about 60% to 70% clay solids and having a pH below 7.0, and then incorporating into said slurry from about 0.02% to 0.2%, based on the moisture free weight of said clay, of sodium fluoride in the form of an aqueous solution thereof, the quantity of sodium fluoride being sufficient to decrease substantially the apparent viscosity of said slurry at a rate of shear of 1530 sec.$^{-1}$ and being insufficient to increase the pH of said slurry to a value above 7.0.

16. A process for producing an acidic clay slurry of reduced viscosity at high shear rates which comprises forming an aqueous slurry of kaolin clay containing a sodium polyphosphate salt as a dispersing agent for said clay and having a pH not to exceed about 6.0, and incorporating sodium fluoride into said slurry, the quantity of sodium fluoride being sufficient to reduce substantially the apparent viscosity of said slurry at a shear rate of 1530 sec.$^{-1}$ to a value that is substantially below the apparent viscosity of said slurry at said shear rate in the absence of said sodium fluoride and being insufficient to increase the pH of said dispersion to a value above 7.0.

17. The method of claim 16 in which said sodium polyphosphate salt is sodium hexametaphosphate.

18. The method of claim 16 in which said sodium polyphosphate salt is sodium tripolyphosphate.

References Cited by the Examiner

UNITED STATES PATENTS

| 2,995,458 | 8/1961 | Murray | 106—288 |
| 3,130,063 | 4/1964 | Millman et al. | 106—288 |
| 3,236,666 | 2/1966 | Sawyer | 106—288 |

HELEN M. McCARTHY, *Acting Primary Examiner.*

TOBIAS E. LEVOW, *Examiner.*

J. POER, *Assistant Examiner.*